Aug. 15, 1950
J. C. HAELEN
2,518,682
FIXED PLANE FILM GUIDING MEANS FOR VIEWING
AND PROJECTION DEVICES
Filed Oct. 17, 1947
2 Sheets-Sheet 1
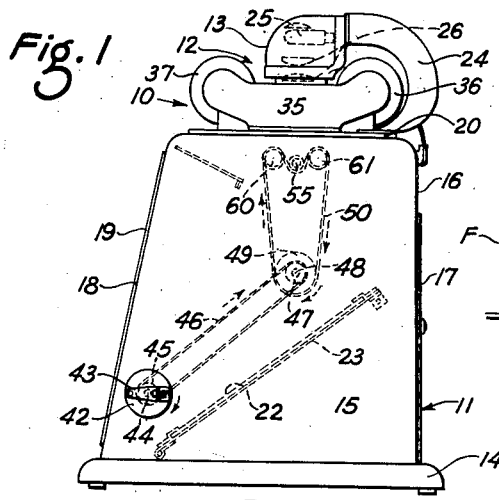
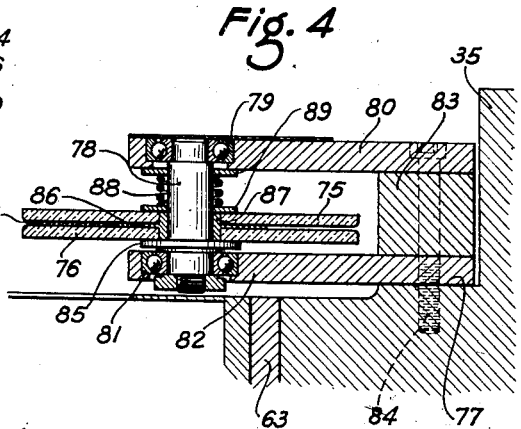
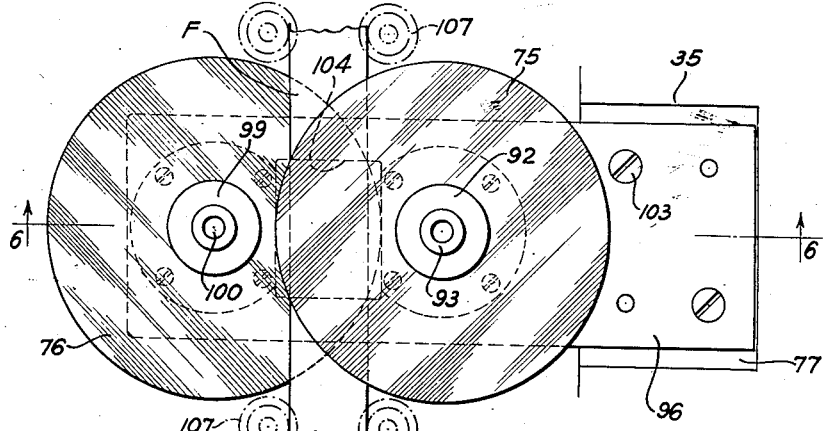
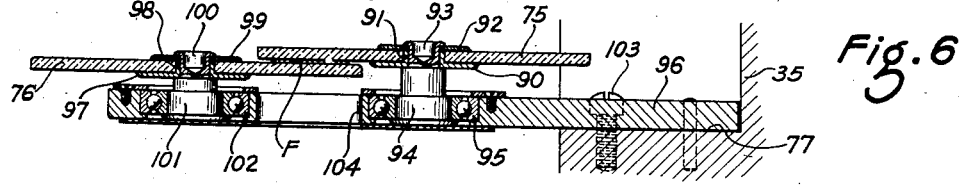
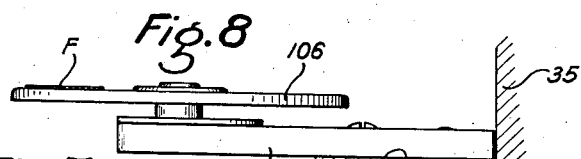
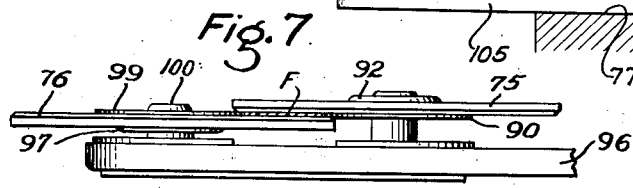
JOHN C. HAELEN
INVENTOR
BY
ATTORNEYS

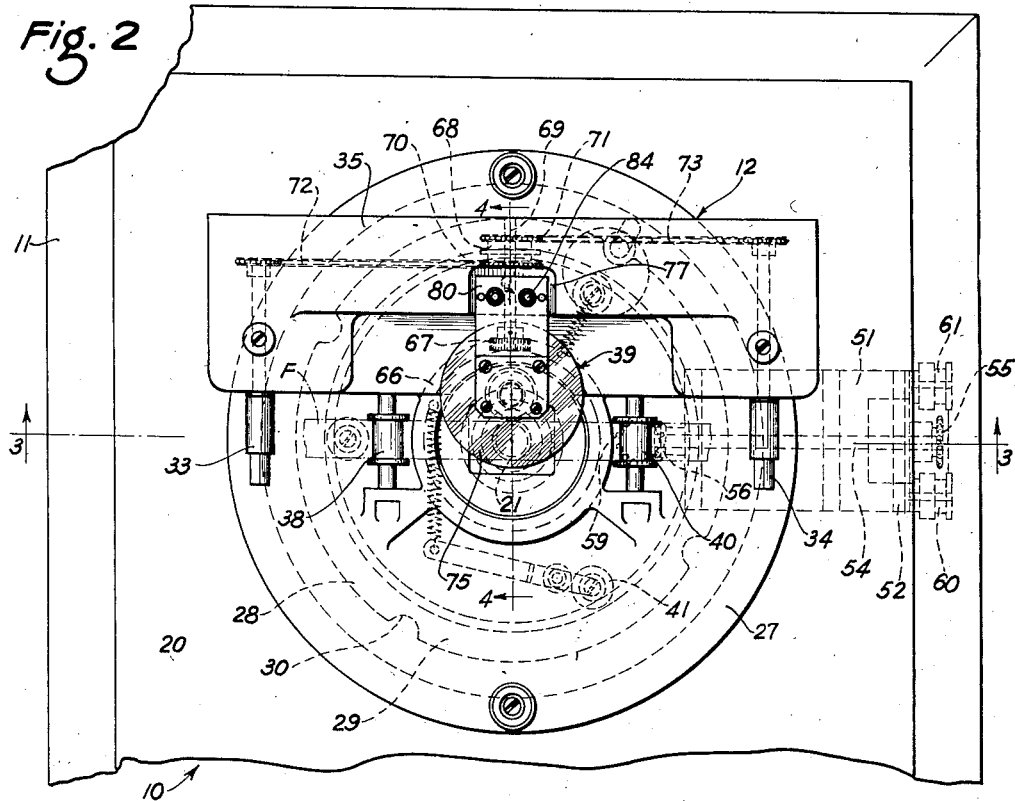
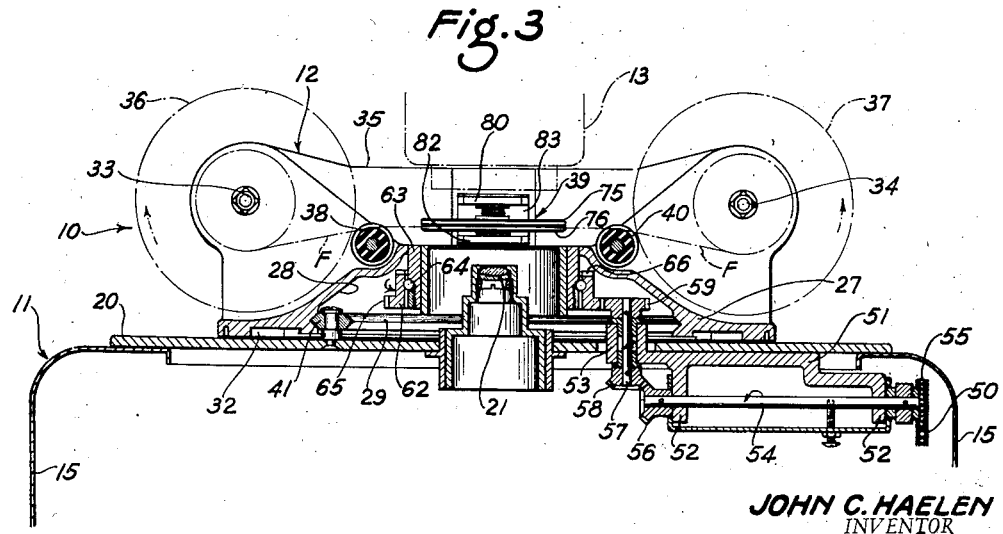

Patented Aug. 15, 1950

2,518,682

UNITED STATES PATENT OFFICE 2,518,682

FIXED PLANE FILM GUIDING MEANS FOR VIEWING AND PROJECTION DEVICES

John C. Haelen, Rochester, N. Y., assignor to Eastman Kodak Company, Rochester, N. Y., a corporation of New Jersey Application October 17, 1947, Serial No. 780,503

15 Claims. (Cl. 88—24)

This invention relates to film handling apparatus and more particularly to an arrangement for guiding a film strip through a fixed plane during movement thereof and also for holding the film strip in a fixed plane during viewing or projection of the film strip.

In certain types of film handling apparatus, such as film readers, it has been customary to hold the film strip between two glass flats during the projection of a particular frame of the film upon the screen. When the film strip is moved for viewing the next or succeeding frames, one of the flats is usually moved with respect to the other in conjunction with the film moving means to eliminate scratching the film and to allow the film strip to be moved freely in either direction between the flats and across the projection aperture. This arrangement necessitates some "lost" motion in the drive for the film strip so that the flat will be raised before the film is moved. As soon as the film strip is moved it assumes a position which is no longer in the focal plane of the objective and, as a result, presents a blurred image on the screen. Attempts have been made to eliminate the blurred image on the screen during movement of the film strip by moving the objective toward the film strip so that the film strip will remain substantially in the focal plane of the objective. To accomplish this, however, additional parts are necessary and the objective must be mounted for movement along its optical axis.

In the present invention, parts are actually eliminated and the entire structure simplified by providing two concentric glass flats which hold the film strip therebetween in the focal plane of the objective at all times. The flats are free to rotate and are spaced apart by an amount about .001 of an inch greater than the film strip thickness. The film strip is held between the glass flats due to the inherent curl of the film strip which exerts a pressure on the inner surfaces of the flats so that when the film strip is moved, the friction between the flats and the film strip will cause the flats to rotate. When the film strip is moved between the rotating glass flats, an ever changing location of contact results between the surface of the film strip and the flats. The nature of this motion is such that any accumulation of foreign material or minute particles of emulsion on the film strip are removed as the film strip passes between the rotating flats. This arrangement also permits a "firm" drive, that is, one in which there is very little, if any, lost motion in the movement of the film strip. Tests made with this arrangement have shown that a film strip moved back and forth 23,000 times between a pair of rotating glass flats was still in good usable condition.

The primary object of the invention, therefore, is to provide a film handling apparatus having a guide means for always maintaining the film strip in the focal plane of the optical system.

A further object of the invention is to provide a film handling apparatus in which the film strip is moved between two concentric, rotatable, spaced, members for engaging the film strip and adapted to be rotated upon movement of the film strip.

A still further object of the invention is to provide a film handling apparatus in which the film strip is moved between two concentric, rotatable, spaced, transparent members for engaging and holding the film strip in the focal plane of the optical system and which are adapted to be rotated upon movement of the film strip.

Yet another object of the invention is to provide a film handling apparatus in which the film strip is moved between two concentric, rotatable, spaced, glass discs for engaging and holding the film in the focal plane of the optical system and which are adapted to be rotated upon movement of the film strip.

And still another object of the invention is to provide a film handling apparatus in which the film strip is moved between two concentric, rotatable, spaced, glass discs, said discs being arranged upon separate axes in overlapping relationship for engaging and holding the film strip in the focal plane of the optical system and adapted to be rotated upon movement of the film strip.

Other objects and advantages will be apparent to those skilled in the art from the description which follows.

The objects of the invention are embodied in a film reader which comprises a casing having a front wall and a top wall, a housing including a light source mounted on said casing, an objective mounted on said top wall, a mirror within said casing for directing the image projected by said objective onto said screen, a film handling means on said top wall including two spaced, rotatable members for supporting a film strip, means for driving the rotatable members in either direction for moving the film strip through the focal plane of said objective, and a guide means including two rotatable, spaced concentric glass discs for engaging and holding the film strip therebetween in the focal plane of said objective and adapted to be rotated upon movement of the film strip.

Reference is now made to the accompanying drawings wherein like reference numerals designate like parts and wherein:

Fig. 1 is a side elevation of a film reader in which the invention is incorporated and which shows the film handling means 90° out of the normal projecting position;

Fig. 2 is a plan view of the top of the film reader with the lamp housing removed to more clearly show the invention;

Fig. 3 is a vertical section taken substantially on the line 3—3 of Fig. 2 and shows the relation of the glass flats to the objective and a portion of the drive for the reel spindles;

Fig. 4 is a vertical section taken substantially on the line 4—4 of Fig. 2 and shows the arrangement for mounting the glass flats;

Fig. 5 is a plan view of another embodiment of the invention and shows the glass flats mounted upon separate axes in overlapping relationship;

Fig. 6 is a vertical section taken substantially on the line 6—6 of Fig. 5 and shows the arrangement for mounting the glass flats upon separate axes;

Fig. 7 is a side elevation of the embodiment shown in Fig. 6 and shows the arrangement for edge guiding the film strip when the glass flats are mounted on separate axes; and Fig. 8 is a side elevation of another embodiment of the invention in which the film strip engages only a single glass flat.

Although the present disclosure of the invention is described as being embodied in a film reader or projector, it shall be understood that this invention may also be applied to many and various other types of film handling apparatus. In the illustrated embodiment of the invention, the film handling apparatus or film reader 10 comprises a casing 11, a rotatable film handling means 12, and a lamp house 13. The casing 11 has a base 14, side walls 15, a rear wall 16 part of which is pivotally mounted on the hinge 17, and a front wall 18 which is provided with an opening for a translucent screen 19. A top wall or plate 20 is riveted, or secured in some similar manner, to the casing 11 and has mounted thereon an objective member 21.

A mirror 22 is mounted on a plate 23 which is hinged to the base 14 and functions to reflect the image received from the objective member 21 onto the screen 19. A light-baffling frame may be mounted inside the casing 11 adjacent the front wall 18 so that when the plate 23 is swung against the frame, the interior of the casing is shielded against any light entering through the screen 19. With this arrangement, the projecting apparatus may be used as a projection enlarger, as is more fully disclosed in U. S. Patent 2,279,463, granted April 14, 1942 to Roy S. Hopkins.

A curved bracket 24 is secured to the plate 20 and carries the lamp house 13 in which the light source 25 and the condenser lenses 26 are mounted for directing a beam of light downwardly into the objective member 21, see Fig. 1.

The film handling means 12 comprises a circular caplike frame 27 provided with an internal cavity 28 and an internal annular V-shaped groove 29. The frame 27 has a circular flange 30 which is provided with notches 31 located in quadrature and with an annular recess 32 adjacent said circular flange 30. The spaced, rotatable members or spindles 33 and 34 are rotatable mounted in respective ends of the housing 35, being preferably journalled within bearings formed integral with the housing 35. Film holders or reels 36 and 37 are positioned on the spindles 33 and 34, respectively. A guide roller 38 is rotatably mounted on frame 27 between the spindle 33 and the film guide means, designated broadly by the numeral 39, and a second guide roller 40 is rotatably mounted on frame 27 between the film guide means 39 and the spindle 34, see Figs. 2 and 3.

Since the objective 21 is mounted on the wall 20 and since the film guide means is mounted on the frame 27, it is extremely important that the mounting means for rotatably supporting the frame 27 maintains the film strip F in the focal plane of the objective 21. To this end, see Fig. 2, the frame 27 is provided with the internal annular groove 29 which has a contour complementary in shape to the peripheries of a plurality of rollers 41 mounted on the wall 20. It will be noted that the rollers 41 and groove 29 are arranged, respectively, on wall 20 and in the frame 27 so that the frame 27 can be rotated concentrically with respect to the objective 21, or so that the axis of rotation coincides with the optical axis through the objective. A more detailed description of the mounting may be had by reference to the above-mentioned patent.

The means for moving the film strip F through the focal plane of the objection comprises a drive means within the casing 11 which is connected to a drive within the housing 35 for rotating the spindles 33 and 34. The drive means in the casing comprises a winding member 42 having a handle 43, shown in the folded position in Fig. 1, and is mounted externally of casing 11 on one end of shaft 44 which is journalled in the side wall 15. A sprocket 45 is mounted on the inner end of shaft 44 within casing 11 and engages a chain 46 encircling a sprocket 47 on a shaft 48 also journalled in the wall 15. A larger sprocket 49 is also mounted on shaft 48 and is encircled by an endless drive member or chain 50. A bracket 51 is secured to the underside of the plate 20 and includes bearing lugs 52 and a sleeve portion 53. A shaft 54 is rotatably supported in the lugs 52 and carries on one end a sprocket 55 and on the other end a mitre gear 56. A stub shaft 57 is journalled in the sleeve 53 and carrier on its lower end a mitre gear 58 in mesh with the gear 56 and on its upper end a pinion 59. A pair of idler supports comprising grooved rollers 60 and 61 are mounted on bracket 51 on opposite sides of shaft 54 and maintain the chain 50 in engagement with the sprocket 55 without permitting appreciable slack in the chain 50. Thus it will be seen that upon rotation of the winding member 42 by handle 43, the shaft 44, chain 46, sprocket 47 will be rotated. In turn, large sprocket 49, chain 50, sprocket 55, shaft 54, mitre gear 56, mitre gear 58, shaft 57 and gear 59 will also be rotated. These elements constitute the winding means on the casing 11 of the apparatus.

The means for moving the film strip through the focal plane of the objective 21 comprises a rotatable ring member, a clutch member, and driving connections from the clutch members to the spindles 33 and 34. The ring member 62, see Fig. 3, is rotatably mounted on the cylindrical sleeve 63 secured to the frame 27 by means of the ball bearing mounting 64. The ring member 62 is provided with a toothed periphery 65 for engaging the pinion 59 and a crown gear portion 66 for meshing with the pinion 67 forming a part of the clutch assembly 68. The clutch assembly 68 is located between the sprockets 70 and 71, see Fig. 2, for selectively driving either spindle 33 or 34, depending on the direction in which the winding member 42 is rotated. The endless chains 72 and 73 connect the sprockets 70 and 71 with the sprockets on the spindles 33 and 34, respectively.

The operation of the complete winding means including the elements in the casing and on the frame 27 will now be described. When the winding member 42 is rotated in a clockwise direction, as indicated by the arrow in Fig. 1, the sprocket 45, the chain 46, and the sprockets 47 and 49 are also rotated in a clockwise direction. At the same time, the endless drive member 50 is moved in the direction indicated by the arrows in Fig. 1 so that the sprocket 55, shaft 54, and mitre gear 56 are rotated in a counter-clockwise direction, and the mitre gear 58, shaft 57 and pinion 59 are rotated in a clockwise direction. By virtue of the pinion 59 meshing with the toothed periphery 65 of the ring member 62, the ring member is rotated in a counter-clockwise direction. The movement of the ring member 62 is transmitted through the crown gear 66 and the pinion 67 to the clutch assembly 68 so that the chain 72 drives the sprocket connected to the spindle 33, thereby permitting the spindle 34 to turn freely. As a result, upon clockwise movement of the member 42, the film strip F will be moved to the left, in Fig. 2, and will be wound upon the reel 36. Conversely, when the winding member 42 is rotated in the opposite direction, all of the winding elements are moved in the opposite direction, and the clutch assembly 68 then changes the drive to the spindle 34 and permits the spindle 33 and reel 36 to turn freely. The film strip will then be moved to the right, in Fig. 2, and wound upon the reel 37.

The guide means for engaging and holding the film strip F in the focal plane of the objective 21 is shown in the preferred embodiment in Figs. 2, 3 and 4. In this arrangement the film strip F is held between the glass discs 75 and 76 which are mounted in position on the shelf 77 of the housing 35. The discs 75 and 76 are mounted on the shaft 78 which has one end journalled in the bearing 79 in the plate 80 and the other end journalled in the bearing 81 in the plate 82. The plates 80 and 82 are maintained in spaced relation by the spacer block 83 and both plates and the block are secured by the screws 84 to the shelf 77. The shaft 78 is provided with a flange 85 against which the disc 76 is positioned. The disc 75 is spaced from the disc 76 by the flange 86 on the bushing 87. The flange thickness should be slightly greater than the film strip thickness and in tests made it was found that a flange thickness .001 of an inch greater than the film strip thickness worked satisfactorily. A compression spring 88 is provided between the washers 89 to maintain both discs in intimate contact with the flanges 85 and 86, and for this reason the overall length of the bushing 87 is made slightly less than the sum of the thickness of the discs 75 and 76 and the flange 86. The spring 88 permits the disc 75 to move relative to the disc 76 when a splice in the film passes therebetween. The inherent curl in the film strip F insures sufficient friction between the film strip and the inner surfaces of the discs so that as the film strip is moved, the discs 75 and 76 are rotated thereby so that the film strip F is always in the focal plane of the objective 21 whether being projected or being moved from one reel to the other. Needless to say, it is of the utmost importance that the discs be mounted upon bearings that will provide as little friction as possible in order to permit the discs to turn very freely when the film strip is moved.

As shown in Fig. 4, the flange 86 serves two purposes, namely, it spaces the discs 75 and 76 from each other by an amount slightly greater than the film strip thickness and its periphery engages the edge of the film strip F to serve as an edge guide for the film strip.

In Figs. 5 and 6 a second embodiment of the invention is disclosed in which the discs 75 and 76 are mounted upon separate axes and lie in overlapping relationship to engage and hold the film strip F therebetween. The disc 75 is clamped between the flange 90 of the bushing 91 and the washer 92 by the turned over end 93 of the stub shaft 94. The shaft 94 is mounted in the bearing 95 in the plate 96 which is secured to the shelf 77 by the screws 103. In a like manner, the disc 76 is clamped between the flange 97 of the bushing 98 and the washer 99 by the turned over end 100 of the stub shaft 101. The shaft 101 is shorter in length than the shaft 94 by an amount sufficient to give the proper clearance between the discs 75 and 76 for the film. The shaft 101 is also mounted in a bearing 102 in the plate 96. The plate 96 is provided with an aperture 104 for the projected image. As in the preferred embodiment, the washer 99 and the flange 90 may be made sufficiently large to maintain the proper spacing between the discs 75 and 76 and serve as edge guides for the film strip, see Fig. 7. The discs 75 or 76 may also be mounted in a spring-biased manner to allow one disc to move relative to the other to accommodate splices or to make insertion of the film strip easier.

The third embodiment, shown in Fig. 8, discloses the use of a single disc 105 which is mounted on the plate 106 in a manner similar to that shown for the discs 75 or 76 in Fig. 6. In this case, the catinary pressure of the film strip is sufficient to cause the disc 105 to rotate as the film is moved in either direction.

In all of the embodiments, the rotation of the discs when the film strip is moved tends to clean or remove any foreign particles from the film due to the ever changing location of contact between the film and the discs as well as maintaining the film strip at all times in the focal plane of the optical system. While in all of the embodiments and in the above description, the discs have been referred to as glass discs, it is to be understood that a transparent plastic material or some similar transparent material may also be used. It is also possible that any one of the embodiments may be used at some point along the film path other than at the projecting or viewing station. In such cases the discs could be opaque and could be made from metal that might be highly polished or chromium plated or from an opaque plastic material as well as glass.

Since these other modifications of the invention are possible, the scope of the invention is not to be limited to the illustrated embodiment but is defined by the appended claims.

I claim:

1. In a film handling apparatus, the combination with a film handling means including two spaced, rotatable members for supporting a film strip, of a guide means between said members and including two transparent rotatable members having opposed plane surfaces for engaging the film strip, and means for maintaining said plane surfaces in spaced relation at a distance substantially equal to but not less than the thickness of said film strip.

2. In a film handling apparatus, the combination with a film handling means including two spaced, rotatable members for supporting a film strip, of a guide means between said members and including two transparent rotatable plane members for engaging the film strip therebetween and rotatable upon movement of said film strip, and spacing means between said rotatable plane members for maintaining said members in spaced relation at a distance slightly greater than the film strip thickness and adapted to be rotated upon movement of said film strip and to edge guide the film strip.

3. In a film handling apparatus, the combination with a film handling means including two spaced, rotatable members for supporting a film strip, of a guide means between said members and including two transparent concentric, members having opposed plane surfaces for engaging the film strip therebetween and adapted to be rotated upon movement of said film strip, and spacing means between said members for maintaining said plane surfaces in spaced relation at a distance substantially equal to but not less than the thickness of said film strip and adapted to rotate with said members.

4. In a film handling apparatus, the combination with a film handling apparatus including two spaced, rotatable members for supporting a film strip, of a guide means between said members and including two concentric glass discs having plane surfaces for engaging the film strip therebetween and adapted to be rotated upon movement of said film strip, and spacing means between said glass discs for maintaining said discs in spaced relation at a distance substantially equal to but not less than the film strip thickness and adapted to be rotated with said glass discs and to edge guide the film strip.

5. In a film handling apparatus, the combination with a film handling means including two spaced, rotatable members for supporting a film strip, of a guide means between said members and including two transparent members, said transparent members being arranged upon separate axes and in overlapping relationship and having opposed plane surfaces for engaging the film strip therebetween and adapted to be rotated upon the movement of the film strip, and means for maintaining said plane surfaces in spaced relation at a distance substantially equal to but not less than the thickness of said film strip.

6. In a film handling apparatus, the combination with a film handling means including two spaced, rotatable members for supporting a film strip, of a guide means between said members and including two spaced, transparent members, said transparent members being arranged upon separate axes in overlapping relationship and having opposed plane surfaces for engaging the film strip therebetween and adapted to be rotated upon the movement of the film strip, and spacing means on each axis for maintaining said plane surfaces in spaced relation at a distance substantially equal to but not less than the thickness of said film strip and adapted to rotate with said transparent member.

7. In a film handling apparatus, the combination with a screen, a light source, an objective between said screen and said light source for projecting an image on said screen, and a film handling means including two spaced, rotatable members for moving a film strip through the focal plane of said objective, of a guide means between said members and including two rotatable transparent members having opposed plane surfaces for engaging and holding the film strip therebetween in the focal plane of said objective and adapted to be rotated upon movement of the film strip, and spacing means for maintaining said plane surfaces in spaced relation at a distance substantially equal to but not less than the thickness of the film strip and adapted to rotate with said transparent members.

8. In a film handling apparatus, the combination with a screen, a light source, an objective between said screen and said light source for projecting an image on said screen, and a film handling means including two spaced, rotatable members for moving a film strip through the focal plane of said objective, of a guide means between said members and including two concentric glass discs having opposed plane surfaces for engaging and holding the film strip therebetween in the focal plane of said objective and adapted to be rotated upon movement of the film strip, and spacing means for maintaining said plane surfaces in spaced relation at a distance substantially equal to but not less than the thickness of the film strip and for edge guiding said film strip and adapted to be rotated with said glass discs.

9. In a film handling apparatus, the combination with a screen, a light source, an objective between said screen and said light source for projecting an image on said screen, and a film handling means including two spaced, rotatable members for moving a film strip through the focal plane of said objective, of a guide means between said members and including two transparent members, said transparent members being arranged upon separate axes in overlapping relationship and having opposed plane surfaces for engaging and holding the film strip therebetween in the focal plane of said objective and adapted to be rotated upon movement of the film strip, and means for maintaining said plane surfaces in spaced relation at a distance substantially equal to but not less than the thickness of said film strip.

10. In a film reader, the combination with a casing having a front wall and a top wall, a housing mounted on said casing and including a light source, a screen on said front wall, an objective mounted on said top wall, a mirror within said casing for directing the image projected by said objective onto said screen, a film handling means on said top wall and including two spaced, rotatable members for supporting a film strip, and means for driving said rotatable members in either direction for moving the film strip through the focal plane of said objective, of a guide means between said rotatable members and includng two concentric transparent members having opposed plane surfaces for engaging and holding the film strip therebetween in the focal plane of said objective and adapted to be rotated upon movement of the film strip, and means for maintaining said plane surfaces in spaced relation at a distance substantially equal to but not less than the thickness of said film strip.

11. In a film reader, the combination with a casing having a front wall and a top wall, a housing mounted on said casing and including a light source, a screen on said front wall, an objective mounted on said top wall, a mirror within said casing for directing the image projected by said objective onto said screen, a film handling means on said top wall and including two spaced, rotatable members for supporting a film strip, and means for driving said rotatable members in either direction for moving the film strip through the focal plane of said objective, of a guide means between said rotatable members and including two rotatable, concentric, glass discs having opposed plane surfaces for engaging and holding the film strip therebetween in the focal plane of said objective and adapted to be rotated upon movement of the film strip, and spacing means between said rotatable glass discs for maintaining said plane surfaces in spaced relation at a distance substantially equal to but not less than the thickness of said film strip and adapted to be rotated with said glass discs.

12. In a film reader, the combination with a casing having a front wall and a top wall, a housing mounted on said casing and including a light source, a screen on said front wall, an objective mounted on said top wall, a mirror within said casing for directing the image projected by said objective onto said screen, a film handling means on said top wall and including two spaced, rotatable members for supporting a film strip, and means for driving said rotatable members in either direction for moving the film strip through the focal plane of said objective, of a guide means between said rotatable members and including two rotatable, concentric, glass discs having opposed plane surfaces for engaging and holding the film strip therebetween in the focal plane of said objective and adapted to be rotated upon movement of the film strip, and means between said glass discs for maintaining said discs in spaced relation at a distance slightly greater than the film strip thickness and adapted to rotate therewith and to edge guide the film strip.

13. In a film reader, the combination with a casing having a front wall and a top wall, a housing mounted on said casing and including a light source, a screen on said front wall, an objective mounted on said top wall, a mirror within said casing for directing the image projected by said objective onto said screen, a film handling means on said top wall and including two spaced, rotatable members for supporting a film strip, and means for driving said rotatable members in either direction for moving the film strip through the focal plane of said objective, of a guide means between said rotatable members and including two spaced transparent members, said transparent members being arranged upon separate axes in overlapping relationship and having opposed plane surfaces for engaging and holding the film strip therebetween in the focal plane of said objective and adapted to be rotated upon movement of the film strip, and means for maintaining said plane surfaces in spaced relation at a distance substantially equal to but not less than the thickness of said film strip.

14. In a film reader, the combination with a casing having a front wall and a top wall, a housing mounted on said casing and including a light source, a screen on said front wall, an objective mounted on said top wall, a mirror within said casing for directing the image projected by said objective onto said screen, a film handling means on said top wall and including two spaced, rotatable members for supporting a film strip, and means for driving said rotatable members in either direction for moving the film strip through the focal plane of said objective, of a guide means between said rotatable members and including two spaced, glass discs, said glass discs being arranged upon separate axes in overlapping relationship and having opposed plane surfaces for engaging and holding the film strip therebetween in the focal plane of said objective and adapted to be rotated upon movement of the film strip, and spacing means for maintaining said plane surfaces in spaced relation at a distance substantially equal to but not less than the thickness of said film strip and adapted to be rotated with said glass discs.

15. In a film reader, the combination with a casing having a front wall and a top wall, a housing mounted on said front wall, an objective mounted on said top wall, a mirror within said casing for directing the image projected by said objective onto said screen, a film handling means on said top wall and including two spaced, rotatable members for supporting a film strip, and means for driving said rotatable members in either direction for moving the film strip through the focal plane of said objective, of a guide means between said rotatable members and including two spaced, glass discs, said glass discs being arranged upon separate axes in overlapping relationship and having opposed plane surfaces for engaging and holding the film strip therebetween in the focal plane of said objective and adapted to be rotated upon movement of the film strip, spacing means for maintaining said plane surfaces in spaced relation at a distance substantially equal to but not less than the thickness of said film strip; and means on each axis adapted to rotate with said glass discs for edge guiding the film strip.

JOHN C. HAELEN.

REFERENCES CITED

The following references are of record in the file of this patent:

UNITED STATES PATENTS

| Number | Name | Date |
| --- | --- | --- |
| 1,896,246 | Owens | Feb. 7, 1933 |
| 2,008,982 | Hopkins | July 23, 1935 |
| 2,125,582 | Pratt et al. | Aug. 2, 1938 |
| 2,213,746 | Schubert | Sept. 3, 1940 |
| 2,279,463 | Hopkins | Apr. 14, 1942 |
| 2,377,476 | Berglund | June 5, 1945 |
| 2,404,189 | Place | July 16, 1946 |
| 2,407,009 | Holbrook | Sept. 3, 1946 |

FOREIGN PATENTS

| Number | Country | Date |
| --- | --- | --- |
| 460,299 | Germany | May 24, 1928 |

Certificate of Correction

Patent No. 2,518,682 August 15, 1950

JOHN C. HAELEN

It is hereby certified that error appears in the printed specification of the above numbered patent requiring correction as follows:

Column 4, line 31, for the word "objection" read *objective*; line 51, for "carrier" read *carries*; column 10, line 25, after "said" and before "front" insert *casing and including a light source, a screen on said*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*